United States Patent
Miyata

(10) Patent No.: US 9,246,203 B2
(45) Date of Patent: Jan. 26, 2016

(54) COMMUNICATION SHEET, SMART SHELF

(71) Applicant: Akira Miyata, Tokyo (JP)

(72) Inventor: Akira Miyata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 54 days.

(21) Appl. No.: 14/362,166

(22) PCT Filed: Nov. 16, 2012

(86) PCT No.: PCT/JP2012/007392
§ 371 (c)(1),
(2) Date: Jun. 2, 2014

(87) PCT Pub. No.: WO2013/080476
PCT Pub. Date: Jun. 6, 2013

(65) Prior Publication Data
US 2014/0361855 A1    Dec. 11, 2014

(30) Foreign Application Priority Data
Dec. 2, 2011   (JP) .................... 2011-265157

(51) Int. Cl.
*H01P 3/02* (2006.01)
*H01Q 1/22* (2006.01)
(Continued)

(52) U.S. Cl.
CPC .............. *H01P 3/02* (2013.01); *G06K 7/10178* (2013.01); *G06K 19/0772* (2013.01); *H01P 3/081* (2013.01); *H01Q 1/2208* (2013.01)

(58) Field of Classification Search
CPC .............. H01P 5/00; H01P 3/02; H05K 5/00; H05K 7/186; G06K 7/10366
USPC .............. 333/24 R, 236; 340/572.1, 572.9
See application file for complete search history.

(56) References Cited

U.S. PATENT DOCUMENTS 7,626,561 B2 * 12/2009 Shinoda ............... H04B 5/0018
343/897
2003/0174099 A1 * 9/2003 Bauer .................. G06K 7/0008
343/893
(Continued)

FOREIGN PATENT DOCUMENTS

JP    2007-323277 A    12/2007
JP    2008-278206 A    11/2008
(Continued)

OTHER PUBLICATIONS

International Search Report for PCT Application No. PCT/JP2012/007392, mailed on Feb. 26, 2013.

*Primary Examiner* — Dean Takaoka

(57) ABSTRACT

A communication sheet (100) according to the present invention that transmits an electromagnetic wave for communication, includes a dielectric layer (120) including a dielectric substrate, a first conductor layer (110) including a mesh sheet-like mesh conductor disposed on one surface of the dielectric substrate; and a second conductor layer (130) including a sheet-like conductor disposed on another surface of the dielectric substrate opposite to the first conductor layer (110). The communication sheet (100) is provided which includes an opening whose width in a direction perpendicular to a traveling direction of the electromagnetic wave for communication traveling through the dielectric layer (120) is not less than 1/20 and not greater than 3/5 of a width in the direction perpendicular to the traveling direction of the dielectric substrate, the opening penetrating from the first conductor layer (110) to the second conductor layer.

9 Claims, 16 Drawing Sheets

(51) Int. Cl.
*G06K 19/077* (2006.01)
*H01P 3/08* (2006.01)
*G06K 7/10* (2006.01)
G06K 17/00 (2006.01)
H04B 13/00 (2006.01)

(56) References Cited

U.S. PATENT DOCUMENTS

2004/0224135 A1* 11/2004 Krebs ................... G06K 7/0008 428/195.1
2011/0221547 A1* 9/2011 Tezuka ............... G06K 7/10316 333/236
2012/0012655 A1* 1/2012 Kai ...................... H01Q 1/2216 235/439

FOREIGN PATENT DOCUMENTS

| | | |
|---|---|---|
| JP | 2009-105598 A | 5/2009 |
| JP | 2009-105599 A | 5/2009 |
| JP | 2009-105600 A | 5/2009 |
| JP | 2009-119045 A | 6/2009 |
| JP | 2010-56952 A | 3/2010 |
| JP | 2010-74792 A | 4/2010 |
| JP | 2010-114696 A | 5/2010 |
| WO | 2007/032049 A1 | 3/2007 |
| WO | 2011/027498 A1 | 3/2011 |

* cited by examiner

ELECTRIC FIELD COMPONENT Ez IN z DIRECTION IN PERIPHERY OF COMMUNICATION SHEET y DIRECTION (DIRECTION PERPENDICULAR TO ELECTROMAGNETIC WAVE TRAVELING DIRECTION)

z DIRECTION (DIRECTION PERPENDICULAR TO COMMUNICATION SHEET)

ELECTRIC FIELD COMPONENT Ey IN y DIRECTION
IN PERIPHERY OF COMMUNICATION SHEET y DIRECTION
(DIRECTION PERPENDICULAR TO ELECTROMAGNETIC WAVE TRAVELING DIRECTION)

ELECTRIC FIELD COMPONENT Ez IN z DIRECTION IN PERIPHERY OF COMMUNICATION SHEET z DIRECTION
(DIRECTION PERPENDICULAR TO COMMUNICATION SHEET)

COMMUNICATION SHEET, SMART SHELF

This application is a National Stage Entry of PCT/JP2012/007392 filed on Nov. 16, 2012, which claims priority from Japanese Application 2011-265157 filed on Dec. 2, 2011, the contents of all of which are incorporated herein by reference, in their entirety.

TECHNICAL FIELD

The present invention relates to a communication sheet and a smart shelf using the communication sheet and, in particular, to a communication sheet whose polarization characteristic has been improved.

BACKGROUND ART

In recent years, the development of a communication sheet that makes an electromagnetic wave travel using an interspace region sandwiched by a mesh-like conductor layer and a sheet-like conductor layer as a transmission path, and combines the electromagnetic wave with an electromagnetic wave in a leaching region leaked from the mesh-like conductor layer, thereby allowing for communication between devices (for example, Patent Literature 1), has been advanced.

As a utilization mode of such communication sheet, various applications that take advantage of features of the two-dimensionality of the communication sheet have been examined. For example, such a utilization mode has been considered where a communication sheet is arranged on a top board, such as a desk, and an information processing terminal, such as a personal computer, placed on the communication sheet performs communication through the communication sheet.

In this case, planarity is required for the communication sheet itself so as not to make the doing of general work at the desk inconvenient. Consequently, Patent Literature 2 to 4 disclose a method for arranging a communication interface device in accordance with a notch or an opening portion of a top board that has the notch and an opening, and supplying an electromagnetic wave to the communication sheet from below.

The communication sheet disclosed in Patent Literature 2 to 4 has a configuration provided with a mesh conductor surface at a lower side of a partial region of the communication sheet so as to be able to connect to the downwardly arranged communication interface device. As such communication sheet, a configuration is disclosed in which, for example, the communication sheet is cut so as to provide an opening in a center thereof, a cut portion is fitted in a remaining portion inside out, and thereby the mesh conductor surface is arranged at a lower side in the center. In addition, a configuration is disclosed in which an end of the communication sheet is cut in a notch shape, a cut portion is fitted in a remaining portion inside out, and thereby the mesh conductor surface is arranged at a lower side in the sheet end.

In addition, as the other utilization mode of the communication sheet, Patent Literature 5 discloses an RFID tag system that manages by a management device book etc. to which RFID (radio identification) tags have been attached using an electromagnetic wave transmission sheet (a communication sheet). The electromagnetic wave transmission sheet of Patent Literature 5 is set to be in a resonant condition by setting a length of a width perpendicular to a traveling direction of an electromagnetic wave to be transmitted as a length substantially equal to natural number times as long as a half-wave length of the electromagnetic wave to be transmitted, and thus reduction of leaked radio waves is achieved. Transmission and reception of a signal and power supply to the electromagnetic wave transmission sheet are performed through an interface arranged at one shorter side of the electromagnetic wave transmission sheet, or an interface arranged at a through hole provided inside of the electromagnetic wave transmission sheet. According to the electromagnetic wave transmission sheet, an electromagnetic wave utilization efficiency can be improved compared with a configuration in which an electromagnetic wave absorbing member for preventing electromagnetic wave leakage etc. is arranged at a sheet end.

In addition to this, Patent Literature 6 discloses a technology to configure an electromagnetic wave transmission medium system by mutually connecting and combining a plurality of electromagnetic wave transmission media in order to reduce a weight of an electromagnetic wave transmission medium (a communication sheet) having a large area and to facilitate the conveyance thereof. Here, as methods for connecting the plurality of electromagnetic wave transmission media, are disclosed a method for connecting one electromagnetic wave transmission medium and the other electromagnetic wave transmission medium by a pair of conductor plates that covers them so as to sandwich them from the front and the back, and a method for hollowing a part of one electromagnetic wave transmission medium, and fitting the other electromagnetic wave transmission medium in the hollowed part to thereby connect them.

CITATION LIST

Patent Literature

Patent Literature 1: International Patent Publication No. WO2007/032049
Patent Literature 2: Japanese Unexamined Patent Application Publication No. 2009-105598
Patent Literature 3: Japanese Unexamined Patent Application Publication No. 2009-105599
Patent Literature 4: Japanese Unexamined Patent Application Publication No. 2009-105600
Patent Literature 5: Japanese Unexamined Patent Application Publication No. 2010-114696
Patent Literature 6: Japanese Unexamined Patent Application Publication No. 2010-56952

SUMMARY OF INVENTION

Technical Problem

When the RFID tag system is constructed using the communication sheet as in Patent Literature 5, a polarization characteristic of the RFID tag may pose a problem.
Namely, since it is inevitably required that the sizes of RFID tags attached to documents etc. be reduced due to their applications, restrictions are imposed on a shape of an antenna, etc. As a result of it, modes, such as circular polarization and elliptical polarization, cannot be used, and the polarization characteristic serves as a mode near linear polarization.

Here, in the communication sheet of Patent Literature 5, as shown in FIGS. 13A and 13B, while an electric field component Ez in a direction (z direction) perpendicular to the communication sheet substantially uniformly extends above the communication sheet, an electric field component Ey in a direction (y direction) perpendicular to the traveling direction of the electromagnetic wave is null above a center of the communication sheet.

Accordingly, although an RFID tag can be recognized if a polarization direction of the RFID tag located above the center of the communication sheet is the z direction, there is a problem that a recognition rate of the RFID tag rapidly decreases when a direction of the RFID tag has deviated from the z direction. Accordingly, there has been a problem that an attachment direction of the RFID tag is limited, thus causing use thereof to be very inconvenient, and a problem that the RFID tag cannot be recognized if a direction thereof is deviated for some reason.

In view of the above-described problems, the present invention aims at providing a communication sheet whose polarization characteristic has been improved and a smart shelf utilizing the communication sheet, the communication sheet changing an electromagnetic field and transmitting a signal in an interspace region sandwiched by a mesh sheet-like conductor layer and a sheet-like conductor layer and a leaching region outside the mesh-like conductor layer.

Solution to Problem

A communication sheet according to an exemplary aspect of the invention that transmits an electromagnetic wave for communication, includes: a dielectric layer including a dielectric substrate; a first conductor layer including a mesh sheet-like mesh conductor disposed on one surface of the dielectric substrate; and a second conductor layer including a sheet-like conductor disposed on another surface of the dielectric substrate opposite to the first conductor layer, wherein an opening whose width in a direction perpendicular to a traveling direction of the electromagnetic wave for communication traveling through the dielectric layer is not less than 1/20 and not greater than 3/5 of a width in the direction perpendicular to the traveling direction of the electromagnetic wave for communication of the dielectric substrate is provided, the opening penetrating from the first conductor layer to the second conductor layer.

A smart shelf according to an exemplary aspect of the invention includes a communication sheet that transmits an electromagnetic wave for communication, which includes: a dielectric layer including a dielectric substrate; a first conductor layer including a mesh sheet-like mesh conductor disposed on one surface of the dielectric substrate; and a second conductor layer including a sheet-like conductor disposed on another surface of the dielectric substrate opposite to the first conductor layer, wherein an opening whose width in a direction perpendicular to a traveling direction of the electromagnetic wave for communication traveling through the dielectric layer is not less than 1/20 and not greater than 3/5 of a width in the direction perpendicular to the traveling direction of the electromagnetic wave for communication of the dielectric substrate is provided, the opening penetrating from the first conductor layer to the second conductor layer.

Advantageous Effects of Invention

According to the present invention, a communication sheet whose polarization characteristic has been improved and a smart shelf utilizing the communication sheet can be provided, the communication sheet changing an electromagnetic field and transmitting a signal in an interspace region sandwiched by a mesh-like conductor layer and a sheet-like conductor layer and a leaching region outside the mesh-like conductor layer.

DESCRIPTION OF EMBODIMENTS

Hereinafter, an embodiment of the present invention will be explained with reference to drawings. The following explanation shows a preferred embodiment of the present invention, and the scope of the present invention is not limited to the following embodiment. In the following explanation, components to which the same symbol is given have a substantially similar content.

Embodiment 1

Figure 1:
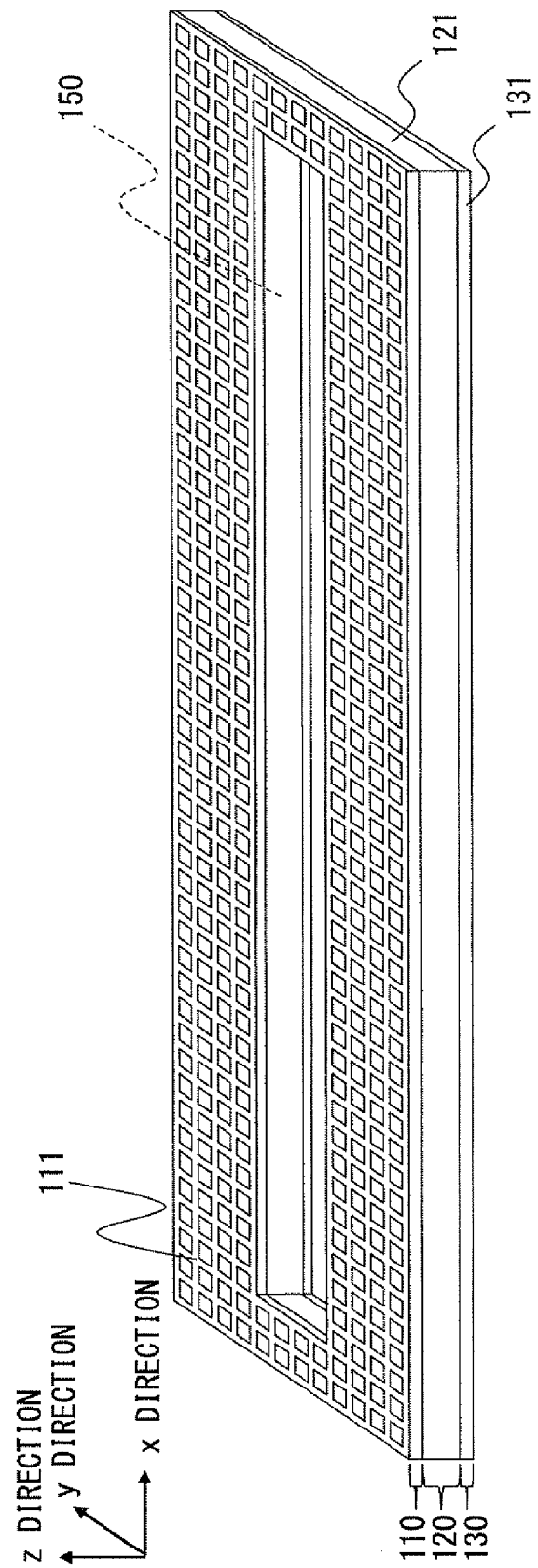
FIG. 1 is an external view of a communication sheet pertaining to an embodiment 1.
Figure 2A:
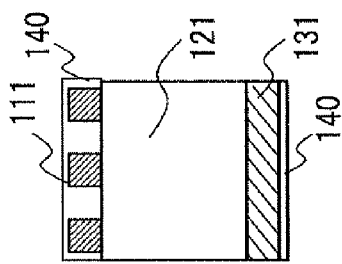
FIG. 2A is an xz cross-sectional view of a center portion of the communication sheet pertaining to the embodiment 1.
Figure 2A:
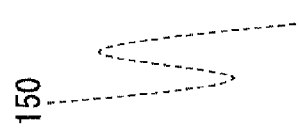
Figure 2A:
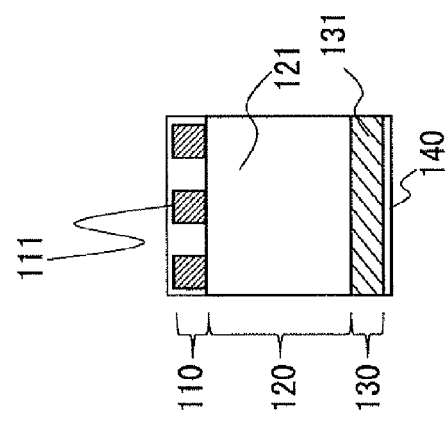
Figure 2B:
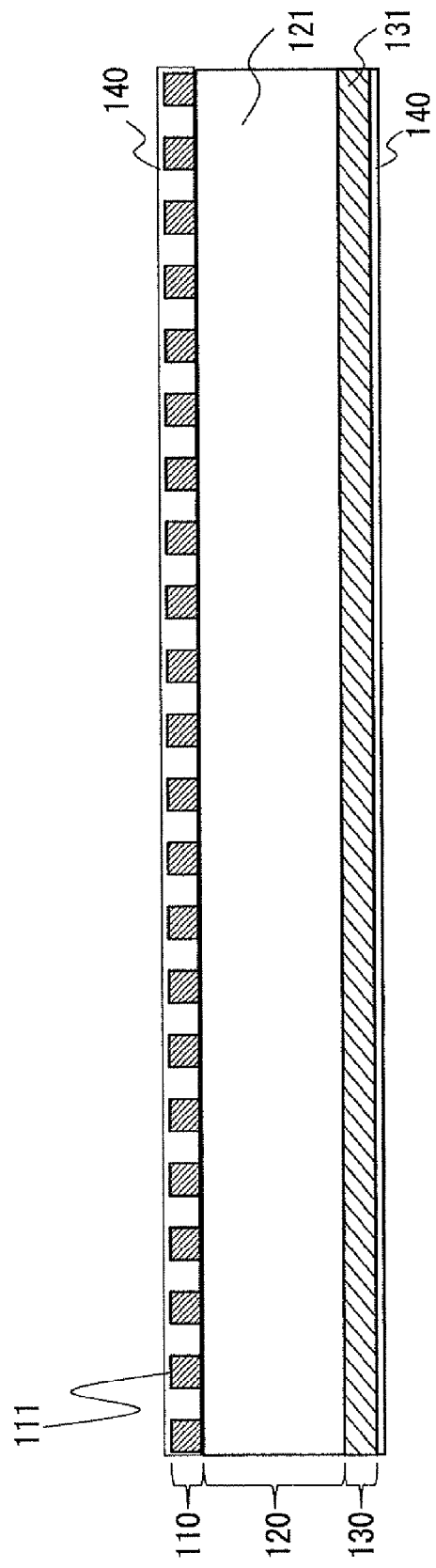
FIG. 2B is an xz cross-sectional view of a peripheral portion of the communication sheet pertaining to the embodiment 1.

Hereinafter, an embodiment 1 of the present invention will be explained with reference to the drawings. FIG. 1 is an external view of a communication sheet 100 pertaining to the embodiment 1. In addition, FIG. 2A is an xz cross-sectional view near a sheet center in a y direction of the communication sheet 100, and FIG. 2B is the xz cross-sectional view near a sheet end in the y direction of the communication sheet 100.

Here, a traveling direction of an electromagnetic wave that propagates in the communication sheet 100 is defined as an x direction, a direction perpendicular to the traveling direction of the electromagnetic wave that propagates in the communication sheet 100 is a y direction, and a direction perpendicular to the communication sheet 100 is a z direction, respectively. The communication sheet 100 is a thin sheet having a rectangular shape, an electromagnetic wave for communication being supplied from an interface device arranged in a short-side direction of the communication sheet, and the electromagnetic wave travelling along a longitudinal direction thereof. Accordingly, the longitudinal direction of the communication sheet 100 corresponds to the x direction, and the short-side direction thereof corresponds to the y direction. In the following explanation, the short-side direction, i.e., the y direction may be called a sheet width direction, and a length in the short-side direction of the communication sheet may be called a sheet width.

The communication sheet 100 is configured to have three stacked layers a first conductor layer 110, a dielectric layer 120, and a second conductor layer 130. The dielectric layer 120 is the layer that serves as a substrate, and through which an electromagnetic wave propagates. The first conductor layer 110 is formed at one surface of a dielectric substrate 121 included in the dielectric layer 120, and the second conductor layer 130 is formed at another surface of the dielectric substrate opposed to the first conductor layer 110, thereby an electromagnetic wave travels through the dielectric layer 120, which is an interspace region sandwiched by the two conductor layers, in a state where a part of the electromagnetic wave leaches from the first conductor layer 110. The first conductor layer 110 and the second conductor layer 130 are covered with a protective film 140, which is an insulator, respectively. It is to be noted that a protective film is appropriately omitted in each of the following drawings.

Each layer has substantially the same belt-like rectangular shape that has substantially the same sheet width, respectively. However, in the communication sheet 100, an opening 150 that penetrates from the first conductor layer 110 to the second conductor layer 130 is provided. Accordingly, each layer has a rectangular shape from which an inside has been cut out.

In the communication sheet 100, a mesh sheet-like mesh conductor is arranged as the first conductor layer 110 at one surface of the thin sheet-like dielectric substrate 121 having the rectangular shape, and a sheet-like sheet conductor is arranged at an opposed surface of the aforementioned substrate as the second conductor layer 130. The communication sheet 100 is then formed by providing a through-opening in a predetermined region.

As a size of the communication sheet 100, for example, a length in the short-side direction can be set to be several to tens of centimeters, and a length in the longitudinal direction can be set to be tens of centimeters to several meters. However, the above shape and the size of the communication sheet 100 are just one example thereof, and the present invention is not limited to this.

Next, each layer included in the communication sheet 100 will be explained in detail.

The first conductor layer 110 is a mesh sheet-like conductor, and is a conductor layer in which a mesh conductor of the predetermined region has been removed and an opening has been provided. Here, "sheet-like" means a state of having an extent as a surface and having a thin thickness. In addition, "mesh sheet-like" refers to a state where a mesh conductor is two-dimensionally arranged extending as a surface at a predetermined mesh period. The "mesh conductor" is the conductor included in a mesh sheet.

Since the first conductor layer 110 is formed of the mesh sheet-like conductor, and thereby a part of an electromagnetic wave propagates leaching from the mesh conductor 111, an electromagnetic wave leaching region is formed above the first conductor layer 110.

The mesh sheet-like mesh conductor can be formed by periodically making a small opening in the sheet-like sheet conductor. It is preferable that a mesh period of a mesh sheet of the first conductor layer 110 be set to be a sufficiently smaller length as compared with an effective wavelength $\lambda$ of an electromagnetic wave for communication that propagates through the interspace region between the first conductor layer 110 and the second conductor layer 130, which are two conductive sheets opposed to each other. Specifically, the mesh sheet of the first conductor layer 110 can have a mesh structure of a mesh period interval of several millimeters to several centimeters as one example.

It is to be noted that when an electromagnetic wave of a 900 MHz band is used as the electromagnetic wave for communication, a wavelength $\lambda_0$ in a free space is approximately 33.3 cm. Here, the effective wavelength $\lambda$ of the electromagnetic wave that travels the dielectric layer 120, which is the interspace region between the first conductor layer 110 and the second conductor layer 130, becomes shorter as compared with $\lambda_0$ since an effective dielectric constant is added to $\lambda_0$. In order to efficiently trap the electromagnetic wave in the interspace region, the mesh period is desirably set to be a length not greater than 1/10 of the effective wavelength $\lambda$.

The dielectric layer 120 includes the dielectric substrate 121, which is a sheet-like dielectric having approximately several millimeters thickness, and is located between the first conductor layer 110 and the second conductor layer 130. It is to be noted that similarly to the mesh conductor 111 of the first conductor layer 110, a part of the dielectric substrate 121 is removed, and an opening is provided. An electromagnetic wave for communication supplied from outside through an interface device for communication propagates through the dielectric layer 120, which is the interspace region between the first conductor layer 110 and the second conductor layer 130, in a state where a part of the electromagnetic wave has leached above the first conductor layer 110. As the dielectric substrate 121, sheet-like resin, rubber, foam, a gel material, etc. can be used.

In the dielectric substrate 121 (communication sheet 100), a length (sheet width) in the short-side direction is not less than 1/3 and not greater than 1/2 of the effective wavelength $\lambda$ of the electromagnetic wave for communication that travels inside the dielectric substrate. When the sheet width of the dielectric substrate 121 exceeds a half-wave length of the effective wavelength $\lambda$ of the above-described electromagnetic wave, unevenness begins to occur in the electric field component Ez that serves as a main mode of communication. Accordingly, even if an RFID tag is properly installed so that received polarization thereof becomes perpendicular to the communication sheet, deterioration of communication accuracy occurs. It is to be noted that the effective wavelength $\lambda$ of the electromagnetic wave described herein is a length obtained by adding the effective dielectric constant of a dielectric included in the dielectric substrate 121 to the wavelength $\lambda_0$ of the electromagnetic wave that propagates through the free space.

The second conductor layer 130 is a sheet-like sheet conductor arranged to be opposed to the first conductor layer 110, and is a conductor layer in which a sheet conductor of a predetermined region has been removed and in which an opening has been provided. The second conductor layer 130 is a so-called conductive sheet, and includes metal with a thin thickness, etc.

Next, functions of the opening 150 provided in the communication sheet 100 will be explained in detail.

As shown in FIG. 1, near a center of the communication sheet 100, the substantially rectangular-shaped opening 150 that penetrates each layer from the first conductor layer 110 to the second conductor layer 130 is provided.

Here, as the opening 150, the substantially rectangular-shaped opening whose length in a short-side direction is set to be not less than 1/20 and not greater than 2/3 of the sheet width of the communication sheet 100, i.e., the length in the short-side direction of the dielectric substrate 121, is provided. Electromagnetic wave radiation from edges of the opening 150 is promoted by setting the length in the short-side direction of the opening 150 to be the above-described length, thus enabling a null region above the communication sheet to be reduced.

Figure 3A:
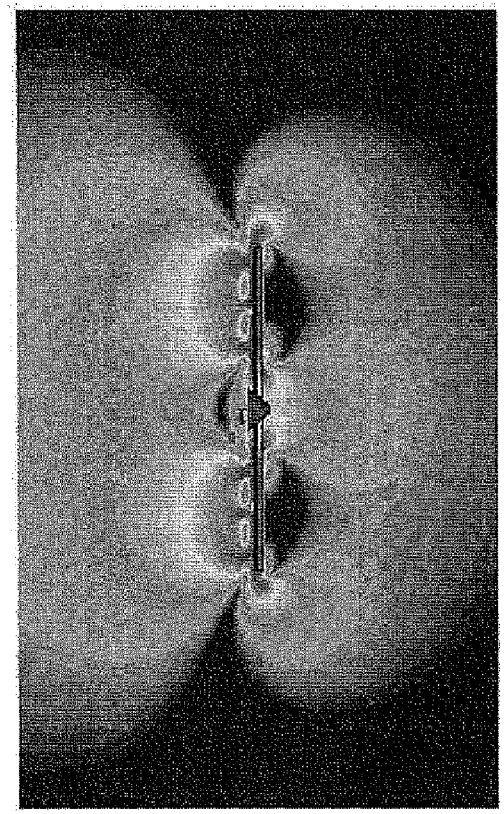
FIG. 3A is a distribution map of an electric field component Ez in a periphery of the communication sheet pertaining to the embodiment 1.
Figure 3B:
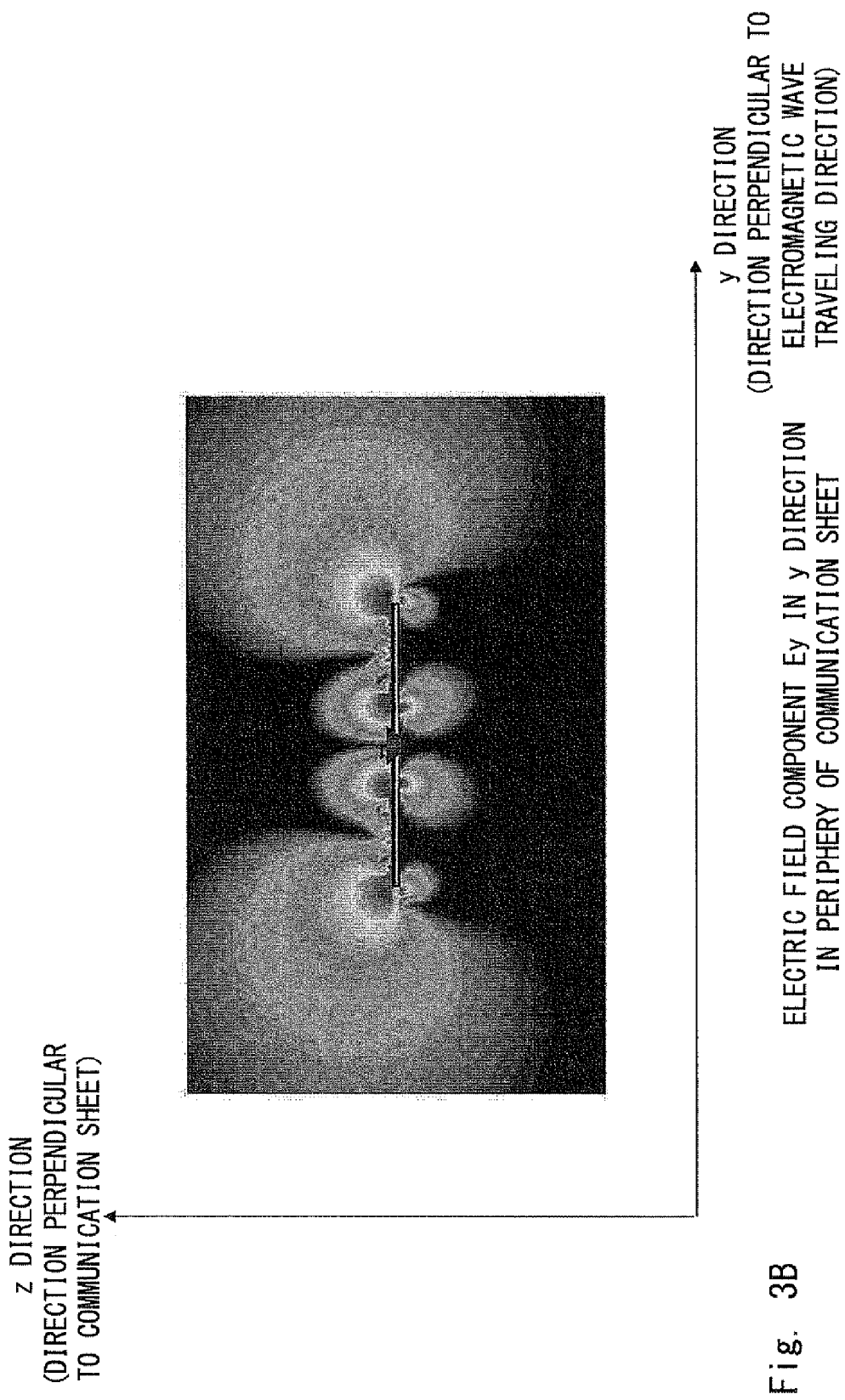
FIG. 3B is a distribution map of an electric field component Ey in the periphery of the communication sheet pertaining to the embodiment 1.

FIG. 3A is a map showing a simulation result of electric field distribution of the electric field component Ez in the z direction in a yz flat surface of a center in the longitudinal direction (x direction) of the communication sheet 100. In addition, FIG. 3B is a map showing a simulation result of electric field distribution of the electric field component Ey in the y direction in the yz flat surface of the center in the longitudinal direction (x direction) of the communication sheet 100. FIGS. 3A and 3B show that a whiter spot has a stronger electric field intensity, and a blacker spot has a weak electric field intensity. A deep-black spot indicates that the electric field intensity is very weak or does not exist.

As conditions for simulation, a size of the communication sheet 100 was set to be 800 mm by 100 mm, materials of the mesh conductors 111 (mesh electrodes) included in the first conductor layer 110 and a sheet conductor 131 (back electrode) included in the second conductor layer 130 were aluminum, and a material of the sheet-like dielectric substrate 121 included in the dielectric layer 120 was polyethylene foam with a thickness of 2 mm and a relative dielectric constant of 1.4. In addition, an electrode width was set to be 1 mm and a pitch was 7 mm as a mesh size of the first conductor layer 110, a size of the opening 150 provided extending from the first conductor layer 110 to the second conductor layer 120 was set to be 600 mm by 30 mm, and the opening 150 was arranged so that the sheet center and an opening center became the same as each other. In addition, since an analysis frequency is 950 MHz, and the effective dielectric constant of the communication sheet 100 is 2.3, the sheet width (100 mm) of the communication sheet 100 has a relation of $0.48\lambda$, to the effective wavelength $\lambda$.

Figure 13A:
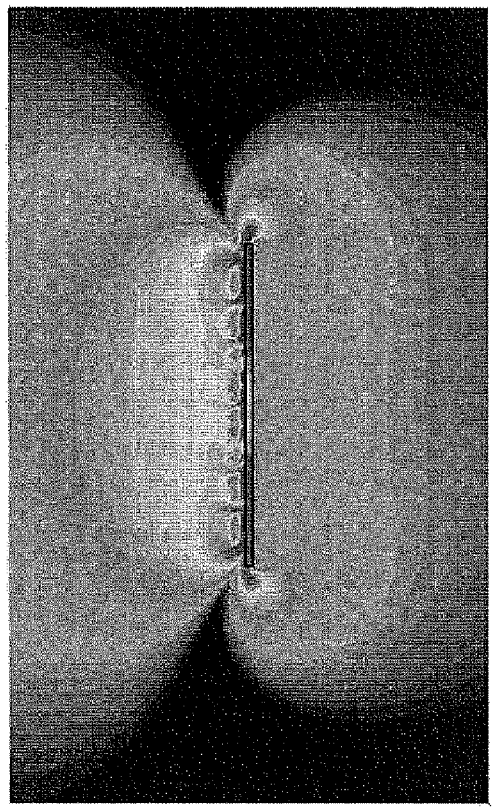
FIG. 13A is a distribution map of the electric field component Ez in a periphery of a communication sheet pertaining to background art.
Figure 13B:
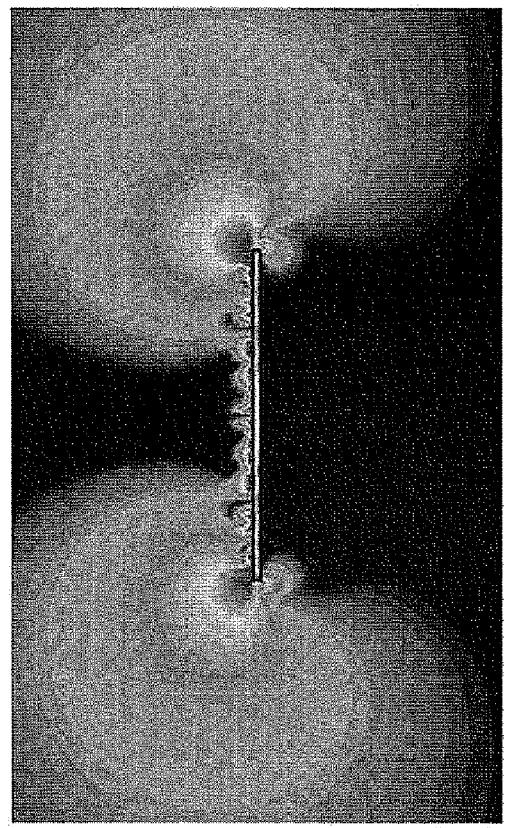
FIG. 13B is a distribution map of the electric field component Ez in the periphery of the communication sheet pertaining to the background art.

As can be seen from FIG. 3B, it turns out that as compared with a case shown in FIG. 13B, which is background art, an area above the center of the communication sheet 100, where the electric field component Ey is null, is reduced, by providing the opening 150 made by hollowing near the center of the communication sheet, and that resistance to position deviation due to the rotation of the RF tag is generated.

Figure 4:
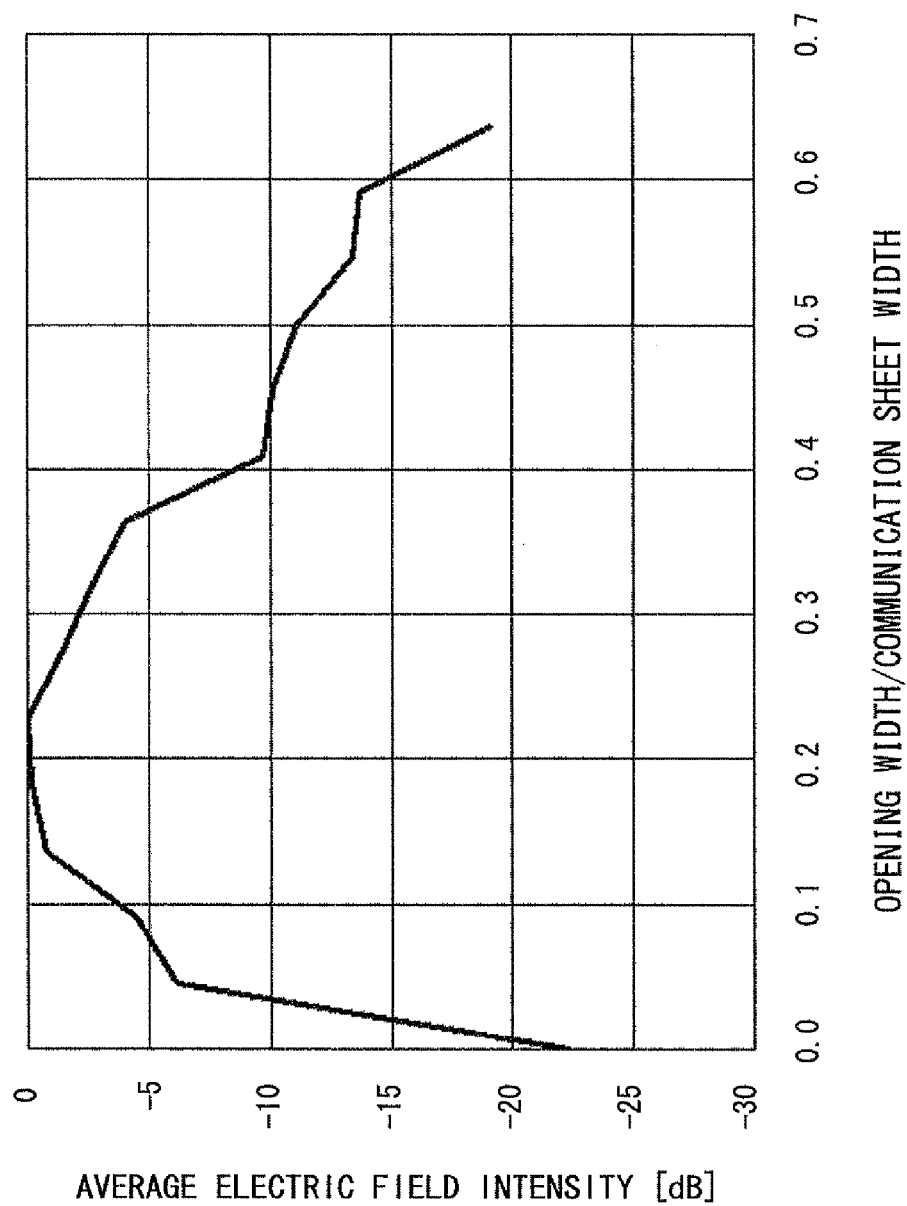
FIG. 4 is a graph showing an average intensity of the electric field component Ey above a communication sheet when a length in a sheet width direction of an opening is changed.

FIG. 4 shows an average value of an Ey electric field intensity at a 6 mm upper position near a center in the sheet width direction (−10 mm to +10 mm) when a length W in the sheet width direction of the opening 150 is changed. As is seen from FIG. 4, an electric field intensity in which communication can be performed begins to be obtained from a point where the length W in the sheet width direction of the opening 150 exceeds 1/20 length of the sheet width of the communication sheet 100 (dielectric substrate 121), and this tendency continues until appropriately 2/3 of the length. Here, particularly, a length not less than 1/10 and not greater than 1/3, which falls in a range from an optimum value to 5 dB, has a remarkable effect, and a length not less than 1/7 and not greater than 1/4 becomes substantially the same as the optimum value.

Figure 5:
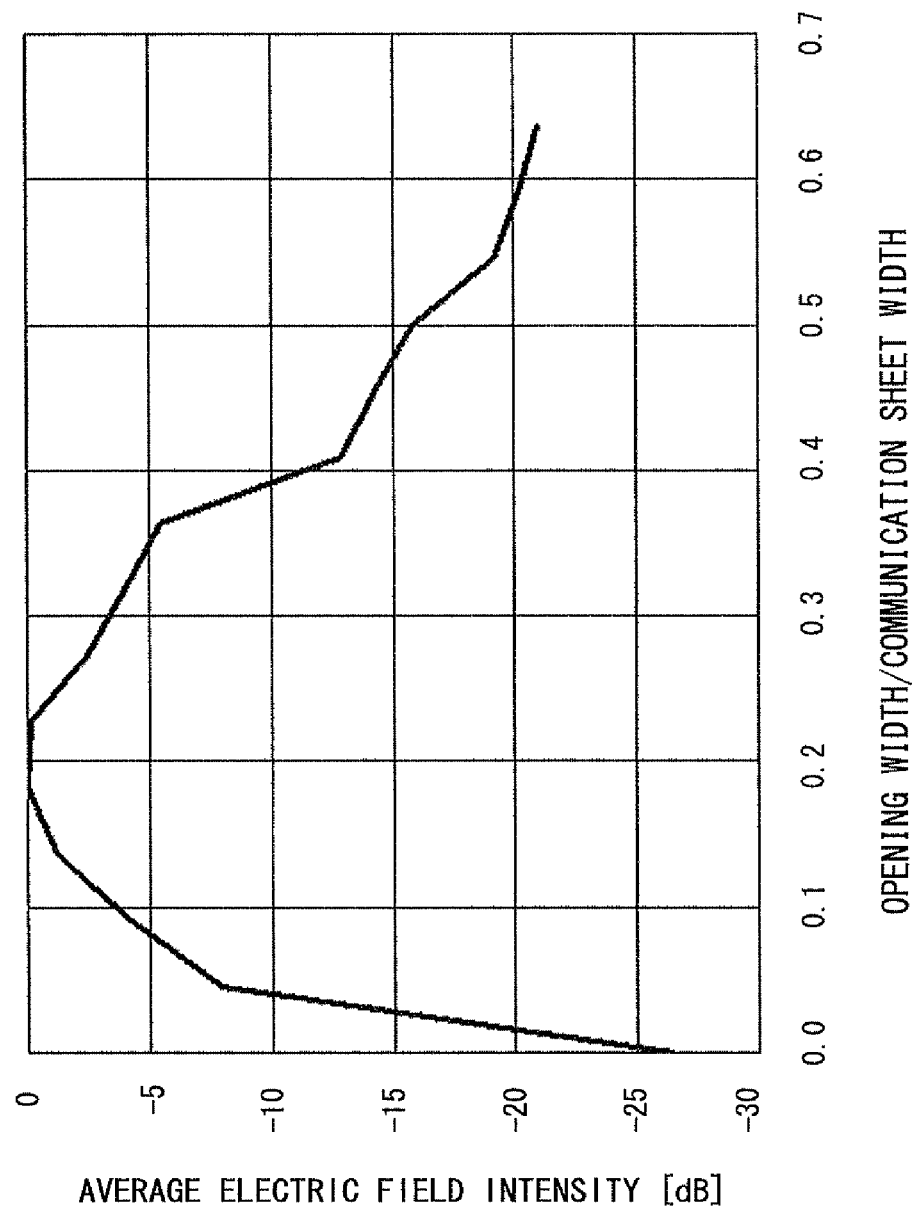
FIG. 5 is a graph showing an average intensity of the electric field component Ey above a communication sheet when a length in a sheet width direction of an opening region is changed in a case where an opening region is formed only in a first conductor layer instead of forming an opening through the whole layers as in the case of the comparative example.

Here, in FIG. 5, as a comparative example is shown an average value of the Ey electric field intensity at the same position in a case where an opening region is provided instead of the opening 150 by removing the mesh conductor 111 in the same range as the opening 150 from the first conductor layer 110. When FIG. 4 is compared with FIG. 5, it is seen that a characteristic of Ey is more improved in a region of a wide opening width when the opening 150 is provided. Namely, the characteristic of Ey is more improved when provided is the opening 150 whose length in the short-side direction is set to be 1/20 length of the communication sheet 100 as compared with the case where the opening region whose length in the short-side direction is set to be the same length. In addition, it turns out that while the electric field intensity attenuates from a point where the length in the short-side direction exceeds 2/3 of the length in the short-side direction of the communication sheet when the above-described opening region is provided, the electric field intensity is maintained approximately at 3/5 of the length in the short-side direction of the communication sheet when the opening 150 is provided.

Figure 6:
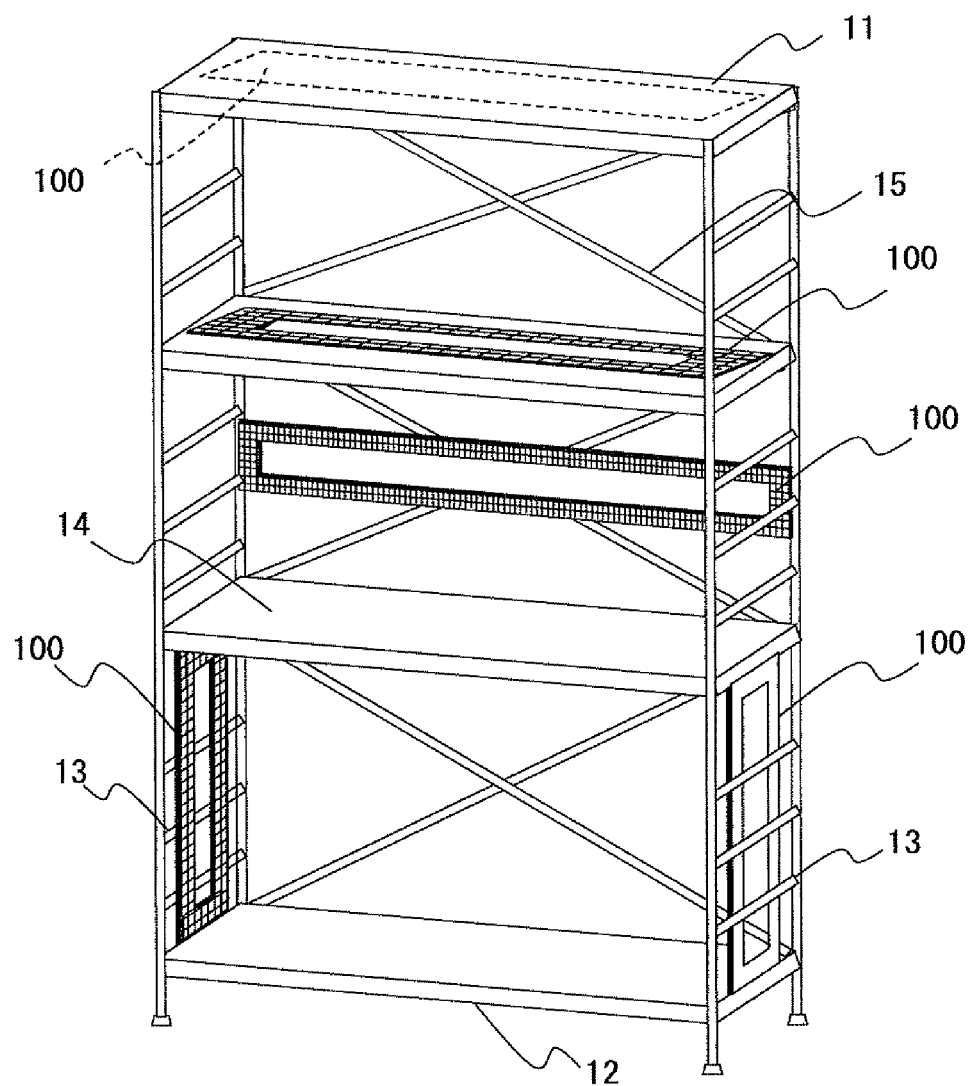
FIG. 6 is an external view of a smart shelf pertaining to the embodiment 1.

Next, one example of a communication system utilizing the communication sheet 100 will be explained. FIG. 6 is a view showing one example of a smart shelf 10 using the communication sheet 100. The smart shelf 10 is a display shelf provided with a function to manage merchandise, such as books and CDs. The smart shelf 10 includes: a top plate 11; a bottom plate 12; side plates 13; shelf plates 14, which are a plurality of partition plates; and a back plate 15 provided at a back surface of the smart shelf 10, and the communication sheet 100 is arranged in a plurality of spaces partitioned by the shelf plates 14, respectively. As shown in FIG. 6, the communication sheet 100 is appropriately arranged at the top plate 11, the bottom plate 12, the side plates 13, the shelf plates 14, and the back plate 15, and books with RFID tags, etc. put in each space can be read through the communication sheet 100, thus enabling merchandise management etc. to be performed.

It is to be noted that when the smart shelf 10 is arranged so that two communication sheets 100 are opposed to each other as shown in FIG. 6, it can be expected to further improve accuracy of RFID tag recognition. In addition, if the communication sheet 100 has a bendable configuration, it is preferable that in the smart shelf 10, the communication sheet 100 be arranged along the side plates 13 and the shelf plate 14, and that the communication sheet 100 be arranged along the side plates 13 and the back plate 15, since a range that can be covered by one communication sheet increases. Such a bendable communication sheet can be realized by using a material having flexibility as a material included in each layer.

As described above, the communication sheet 100 pertaining to the embodiment 1 is provided with: a dielectric layer including a dielectric substrate whose width length in a direction perpendicular to a traveling direction of an electromagnetic wave for communication is set to be a length not less than 1/3 and not greater than 1/2 of an effective wavelength of the electromagnetic wave for communication; a first conductor layer including a mesh sheet-like mesh conductor arranged at one surface of the dielectric substrate; and a second conductor layer including a sheet-like conductor arranged at a surface opposed to the first conductor layer, the surface being one surface of the dielectric substrate. Here, in the communication sheet 100, an opening whose width direction in the direction perpendicular to the traveling direction of the electromagnetic wave for communication is set to be a length not less than 1/20 and not greater than 3/5 of the width length of the dielectric substrate, the opening being one that penetrates from the first conductor layer to the second conductor layer, is provided.

By employing the above configuration, the communication sheet can be made to have resistance to the position deviation due to the rotation of the RFID tag, etc. by reducing a null region of the Ey component above the communication sheet. In addition, since the communication sheet 100 can be formed by providing a through hole in a form where the first conductor layer, the dielectric layer, and the second conductor layer included in the communication sheet 100 are collectively cut out, processing is easy, and it becomes possible to lower manufacturing cost.

In addition, although in the above-described explanation, a case has been explained where a center axis in the short-side direction of the opening 150 and a center axis in the short-side direction of the communication sheet 100 (dielectric substrate 121) coincide with each other, and thereby the opening 150 is provided in the center of the communication sheet 100, the present invention is not limited to this. The opening 150 may be provided in a form in which it is deviated in the short-side direction from the center of the communication sheet 100 by a predetermined distance.

Embodiment 2

Hereinafter, an embodiment 2 of the present invention will be explained with reference to the drawings. However, the explanation of portions which have already been explained in the embodiment 1 will be partially omitted for clarification of the invention.

Figure 7:
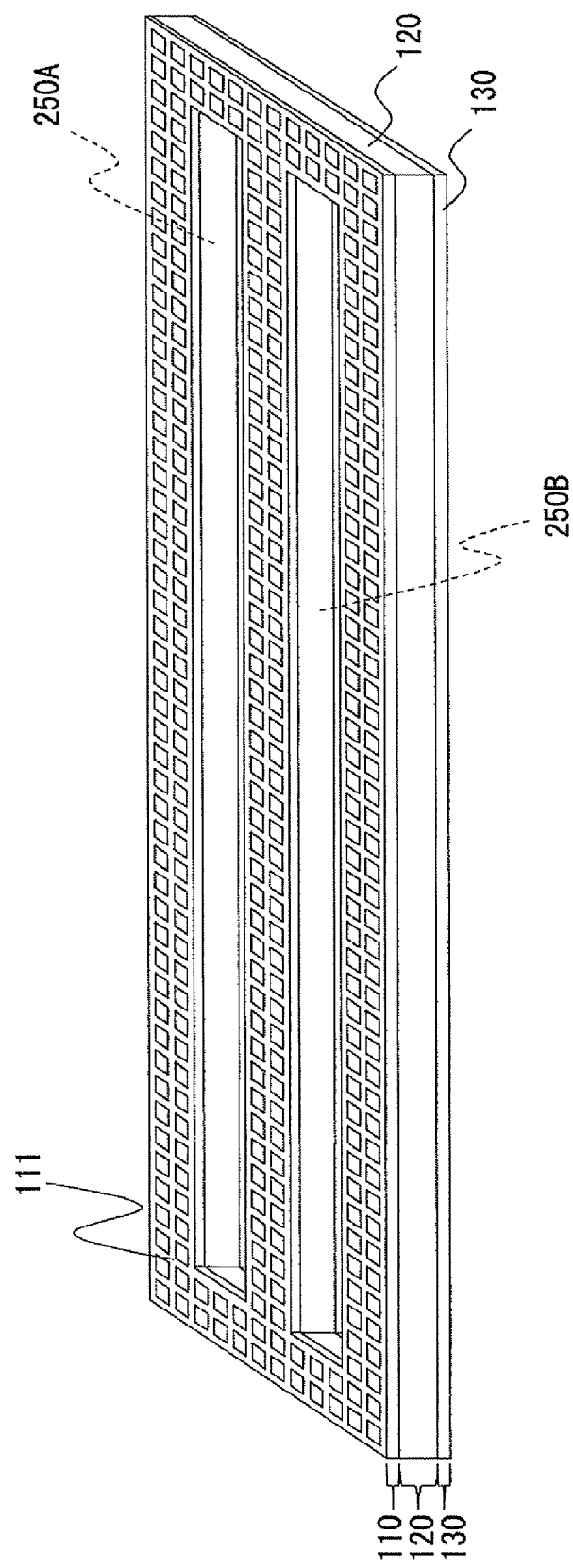
FIG. 7 is an external view of a communication sheet pertaining to an embodiment 2.

FIG. 7 is an external view of a communication sheet 200 pertaining to the embodiment 2. The communication sheet 200 is configured to have stacked layers, the first conductor layer 110, the dielectric layer 120, and the second conductor layer 130, similar to those of the communication sheet 100.

Here, the communication sheet 200 is characterized by having a plurality of openings 250 as compared with the communication sheet 100. Specifically, in the communication sheet 200, two openings 250A and 250B whose width lengths in a short-side direction are not less than 1/20 and less than 1/2 of a length in a short-side direction of the communication sheet 200 (dielectric substrate 121) are arranged in parallel in the short-side direction of the communication sheet 200. Here, since the two openings are provided in parallel in the short-side direction in the communication sheet 200, the length in the short-side direction of the opening 250 becomes less than 1/2. As described above, two substantially rectangular-shaped openings 250 are arranged side by side in the short-side direction, and thereby the number of edges of the openings 250 on the communication sheet 200 is increased as compared with that of the communication sheet 100 of the embodiment 1. Accordingly, a range covered by radiation of an electromagnetic wave radiated from the edges extends, and it becomes possible to further reduce a null region.

As described above, in the communication sheet 200, the plurality of openings 250 are arranged in parallel in the short-side direction of the dielectric substrate 121, each of the openings 250 having the substantially rectangular shape whose length in the short-side direction is set to be not less than 1/20 and less than 1/2 of the length in the short-side direction of the dielectric substrate 121. By employing this configuration, an area where the electric field components are null can be further reduced.

Figure 8:
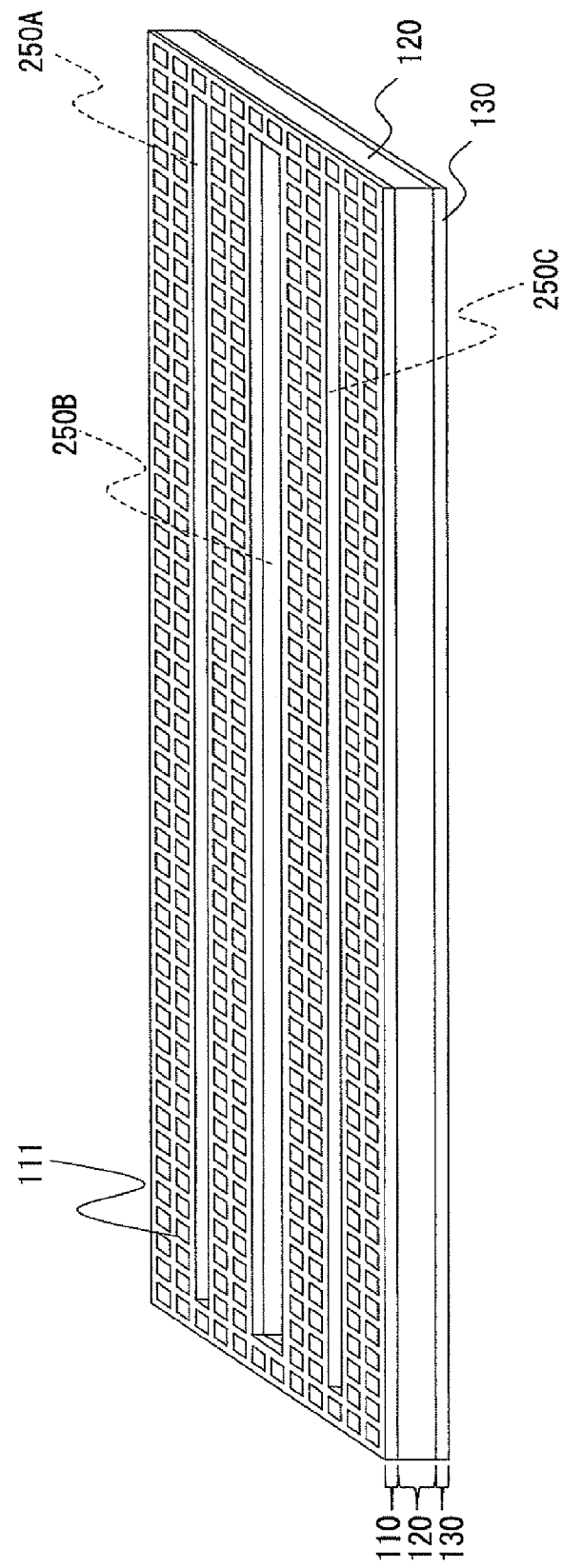
FIG. 8 is an external view of another form of a communication sheet pertaining to the embodiment 2.

It is to be noted that although in regard to the above-described communication sheet 200, a case where the two openings 250 are arranged in parallel has been explained, the present invention is not limited to this. As shown in FIG. 8, more openings 250A to 250C may be arranged in parallel in the short-side direction (i.e., the direction perpendicular to the traveling direction of the electromagnetic wave) of the communication sheet 200. In this case, a length in a short-side direction of each of the openings 250A to 250C may be less than 1/3 of a sheet width. However, since a size of the opening 250 that produces a null suppression effect starts with the length of 1/20, a maximum value of the number of openings that are arranged in parallel in the short-side direction is 19.

It is to be noted that in the plurality of substantially rectangular-shaped openings arranged in parallel, the openings may be hollowed in such a state that they penetrate from the first conductor layer 110 to the second conductor layer 130 so that a width length in a short-side direction differs for each opening, or that the openings with the same width length may be provided.

Here, when the number of the openings 250 that are arranged in parallel is two, a length in the short-side direction of each opening 250 is preferably not less than 1/10 and not greater than 1/3 of a length of a sheet width of the communication sheet 200, and when the three openings 250 are provided, the length in the short-side direction of each opening 250 is preferably not less than 1/7 and not greater than 1/4 of the length of the sheet width of the communication sheet 200.

Embodiment 3

Hereinafter, an embodiment 3 of the present invention will be explained with reference to the drawings. However, the explanation of portions which have already been explained in the embodiments 1 and 2 will be partially omitted for clarification of the invention.

Figure 9:
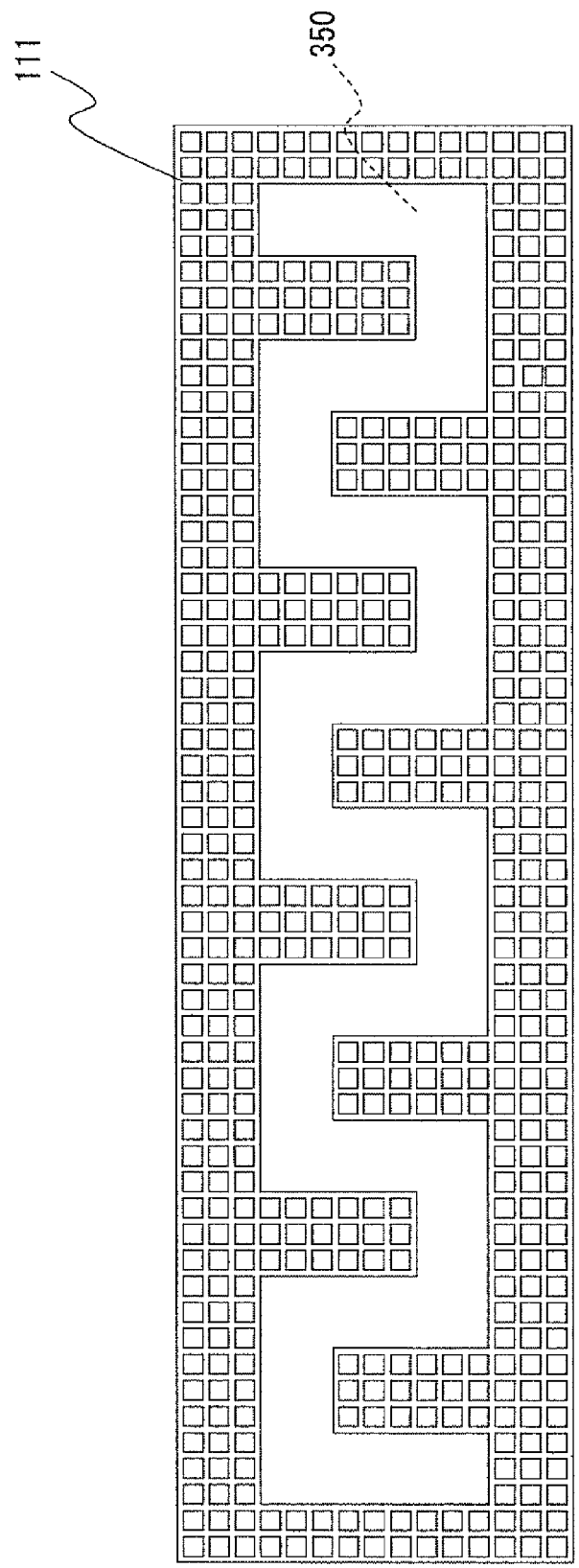
FIG. 9 is a top view of a communication sheet pertaining to an embodiment 3.
Figure 11:
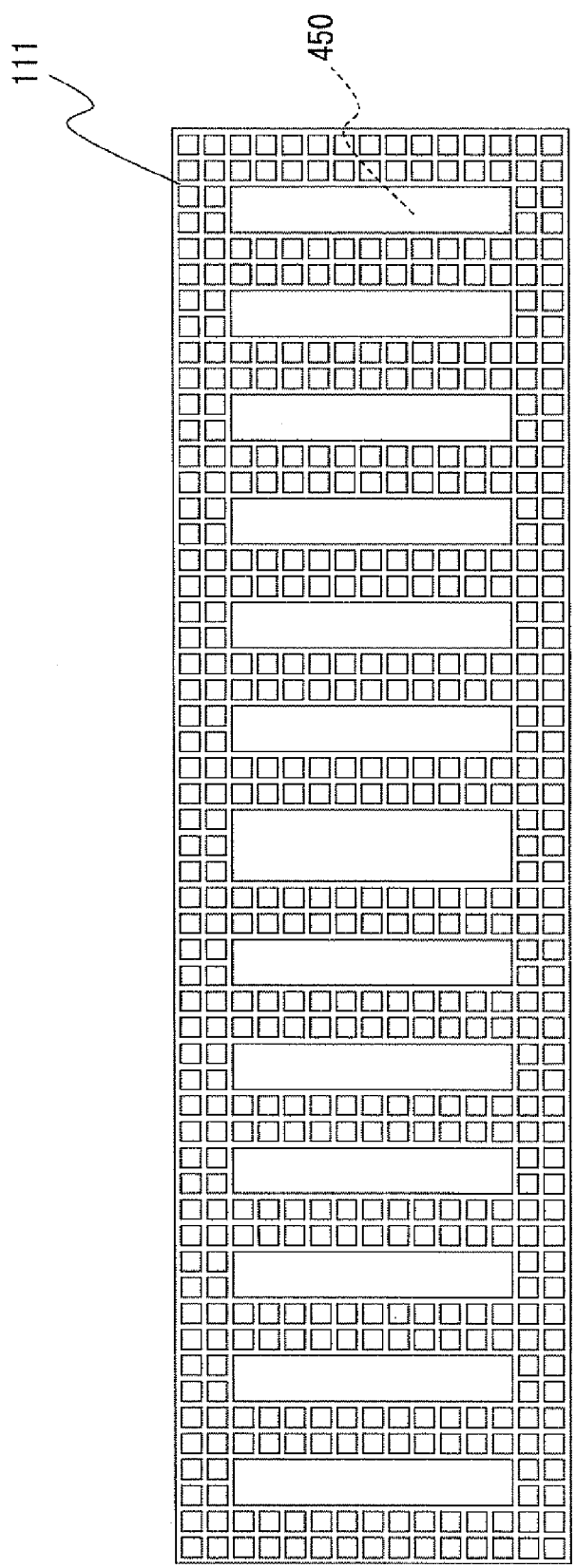
FIG. 11 is a top view of a communication sheet pertaining to an embodiment 4.

FIG. 9 is a plan view of a communication sheet 300 pertaining to the embodiment 3. As shown in FIG. 11, a meander-shaped opening 350 is provided in the communication sheet 300 in a form where the communication sheet 300 has been hollowed.

As is also seen from the electric field distribution of FIG. 3B, even though an opening is provided near a center of the communication sheet, a slight region where the electric field component becomes null remains in a center of the opening. Consequently, an area where the electric field component becomes null can be further reduced by making a shape of the opening into a meander one.

Figure 10:
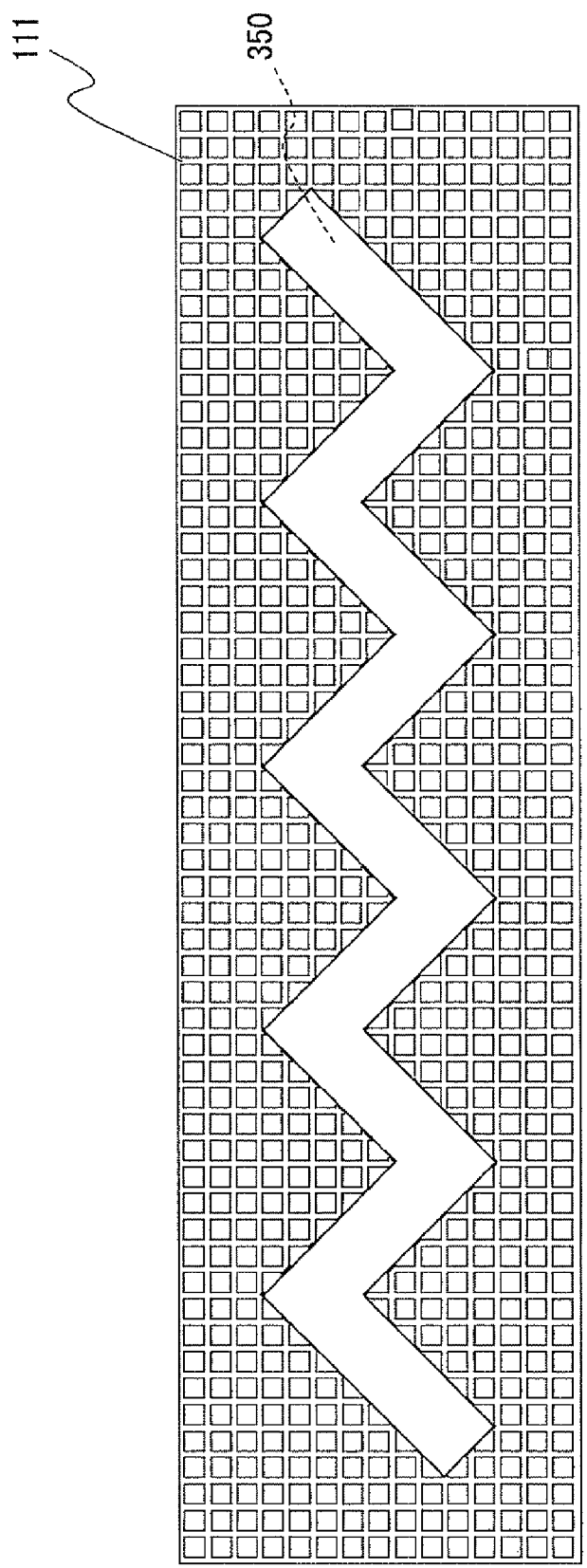
FIG. 10 is a top view of another form of a communication sheet pertaining to the embodiment 3.

It is to be noted that a shape of the meander-shaped opening 350 provided in the communication sheet 300 is not limited to the one shown in FIG. 9, and that as shown in FIG. 10, the meander-shaped opening 350 may be provided where a W-shaped (zigzag-shaped) hollow structure has been arranged in a longitudinal direction of the communication sheet. In addition, the number of meander-shaped openings is not limited to one, and a plurality of meander-shaped openings may be provided in parallel as in the embodiment 2. In addition to this, as the shape of the opening, an S-shaped (wave-shaped) meander shape can be employed.

In addition, as also for the case of the meander-shaped opening, a length in a sheet width direction is preferably not less than 1/20 and not greater than 3/5 of a length in the sheet width direction of the communication sheet 300, a length not less than 1/10 and not greater than 1/3 has a remarkable effect, and a length not less than 1/7 and not greater than 1/4 is particularly preferable since it is substantially the same as the optimum value.

Embodiment 4

Hereinafter, an embodiment 4 of the present invention will be explained with reference to the drawings. However, the explanation of portions which have already been explained in the embodiments 1 to 3 will be partially omitted for clarification of the invention.

FIG. 11 is a plan view of a communication sheet 400 pertaining to the embodiment 4. As shown in FIG. 11, a plurality of openings 450 are provided in the communication sheet 400 in a form where the communication sheet 400 has been hollowed.

Here, the opening 450 is characterized by having a substantially rectangular-shaped hollow structure that has a longitudinal direction with respect to a short-side direction of the communication sheet 400 (dielectric substrate 121). A length in the longitudinal direction of each opening 450 is selected from lengths not less than 1/20 and not greater than 3/5 of the length in the short-side direction of the dielectric substrate 121. Additionally, the plurality of openings having such a shape are arranged in parallel in a longitudinal direction of the communication sheet 400.

As described above, in the communication sheet 400, the plurality of openings are arranged in parallel in the longitudinal direction of the dielectric substrate 121, each of the openings having a substantially rectangular shape whose length in the longitudinal direction is set to be not less than 1/20 and not greater than 3/5 of the length in the short-side direction of the dielectric substrate 121 (communication sheet 400). Also by employing the configuration, a null area above the communication sheet 400 is reduced. It is to be noted that in this case as well, the plurality of openings are preferably periodically arranged in parallel in the longitudinal direction of the dielectric substrate 121 at a predetermined interval, each of the openings having a substantially rectangular shape whose length in a longitudinal direction is set to be not less than 1/10 and not greater than 1/3 of the length in the short-side direction of the dielectric substrate 121, or further preferably, not less than 1/7 and not greater than 1/4 thereof. The length and a periodic interval in the short-side direction of the opening preferably fall within a range of several millimeters to several centimeters in consideration of widths of managed books, CDs, etc.

Hereinbefore, as explained in regard to each of the above embodiments, according to the communication sheet of the present invention, improvement in a recognition rate of an RFID tag can be achieved by improving a polarization characteristic while suppressing radiation of an unnecessary electromagnetic wave.

It is to be noted that although in the above-described explanation, a smart shelf has been explained as being a utilization mode of the communication sheet of the present invention, the present invention is not limited to this, and can be applied to other products and systems.

Figure 12:
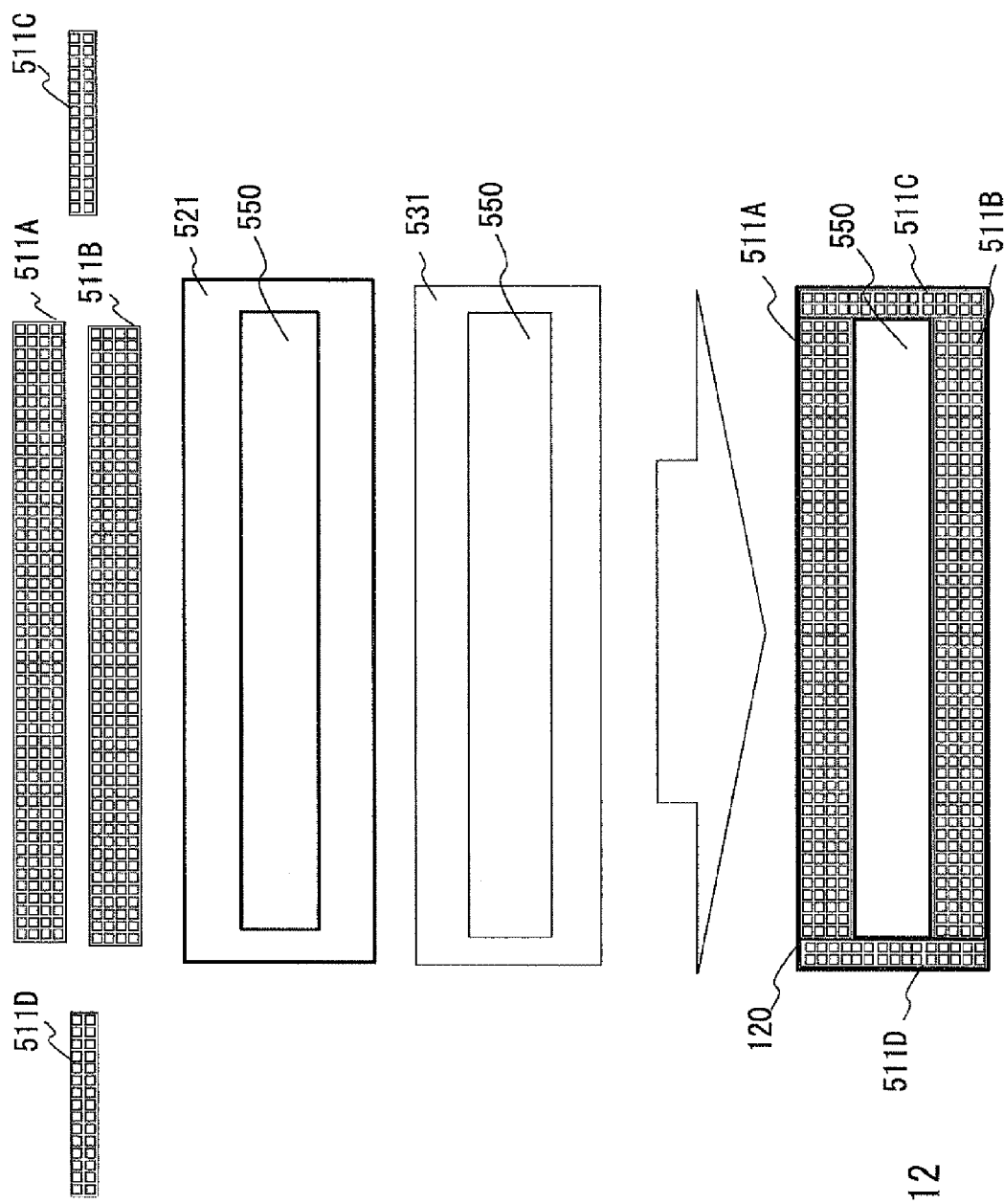
FIG. 12 is a view showing one example of a formation method of a communication sheet.

In addition, although in the above-described explanation, a case has been explained where an opening is provided by hollowing a predetermined region from a first conductor layer to a second conductor layer, after the first conductor layer including a mesh conductor and the second conductor layer including a sheet conductor are formed at surfaces of a dielectric substrate opposed to each other, respectively, the present invention is not limited to this. For example, as shown in FIG. 12, four divided mesh sheet-like mesh conductors 511A to 511D are arranged side by side on the dielectric substrate 120 whose inside has been previously hollowed and in which an opening 550 has been provided, and thereby the first conductor layer 110 may be formed. Similarly, a sheet-like sheet conductor 531 whose inside has been previously hollowed and in which the opening 550 has been provided is arranged at a back surface of a dielectric substrate 521, and thereby the second conductor layer 130 may be formed. Also by such formation methods, an opening that penetrates from the first conductor layer to the second conductor layer is provided in a communication sheet.

In addition, although in the above-described explanation, a case has been explained where the communication sheet is hollowed and the opening is provided, the invention may be configured to save the dielectric substrate for the purpose of keeping a strength of the communication sheet. Namely, by removing a mesh conductor from a part of the first conductor layer, a first opening region may be formed whose width length in a direction perpendicular to the traveling direction of the electromagnetic wave for communication that travels the dielectric layer is not less than 1/20 and not greater than 3/5 of a width length (sheet width) in the direction perpendicular to the traveling direction of the electromagnetic wave for communication of the dielectric substrate. Similarly, by removing from the second conductor layer a sheet conductor in a position opposed to the above-described first opening region, a second opening region may be formed whose width length in the direction perpendicular to the traveling direction of the electromagnetic wave for communication that travels through the dielectric layer is not less than 1/20 and not greater than 3/5 of the width length (sheet width) in the direction perpendicular to the traveling direction of the electromagnetic wave for communication of the dielectric substrate. Here, it is preferable if width lengths in a sheet width direction of the above-described first opening region and second opening region are not less than 1/10 and not greater than 1/3 of a sheet width of the dielectric substrate, and further preferably not less than 1/7 and not greater than 1/4 thereof, since an effect of reducing a null area is great.

It is to be noted that the present invention is not limited to the above-described embodiments, and that they can be appropriately changed without departing from the spirit of the invention. For example, the present invention can take the following modes.

Appendix 1

1. A communication sheet that transmits an electromagnetic wave for communication, comprising:
    a dielectric layer including a dielectric substrate;
    a first conductor layer including a mesh sheet-like mesh conductor disposed on one surface of the dielectric substrate; and
    a second conductor layer including a sheet-like conductor disposed on another surface of the dielectric substrate opposite to the first conductor layer,
    wherein an opening whose width in a direction perpendicular to a traveling direction of the electromagnetic wave for communication traveling through the dielectric layer is not less than 1/20 and not greater than 3/5 of a width in the direction perpendicular to the traveling direction of the electromagnetic wave for communication of the dielectric substrate is provided, the opening penetrating from the first conductor layer to the second conductor layer.

Appendix 2

The communication sheet according to Appendix 1, wherein the dielectric substrate is a substantially rectangular sheet-like substrate in which the opening is provided, and a length in a short-side direction of the dielectric substrate is not less than ⅓ and not greater than ½ of an effective wavelength of the electromagnetic wave for communication traveling through the dielectric layer.

Appendix 3

The communication sheet according to Appendix 2, wherein as the opening, an opening is provided in a center in the short-side direction of the dielectric substrate, the opening having a substantially rectangular shape whose length in a short-side direction is set to be not less than 1/20 and not greater than ⅗ of the length in the short-side direction of the dielectric substrate.

Appendix 4

The communication sheet according to Appendix 2, wherein as the opening, a plurality of openings are provided in parallel in the short-side direction of the dielectric substrate, each of the openings having a substantially rectangular shape whose length in a short-side direction is set to be not less than 1/20 and less than ½ of the length in the short-side direction of the dielectric substrate.

Appendix 5

The communication sheet according to Appendix 3 or 4, wherein the length in the short-side direction of the opening is not less than 1/10 and not greater than ⅓ of the length in the short-side direction of the dielectric substrate.

Appendix 6

The communication sheet according to Appendix 5, wherein the length in the short-side direction of the opening is not less than 1/7 and not greater than ¼ of the length in the short-side direction of the dielectric substrate.

Appendix 7

The communication sheet according to Appendix 2, wherein as the opening, a plurality of openings are provided in parallel in a longitudinal direction of the dielectric substrate, each of the openings having a substantially rectangular shape whose length in a longitudinal direction is set to be not less than 1/20 and not greater than ⅗ of the length in the short-side direction of the dielectric substrate.

Appendix 8

The communication sheet according to Appendix 2, wherein as the opening, provided is an opening having a meander shape whose width is set to be not less than 1/20 and not greater than ⅖ of the length in the short-side direction of the dielectric substrate.

Appendix 9

A smart shelf comprising the communication sheet according to any one of Appendices 1 to 8.

Appendix 10

A smart shelf in which the bendable communication sheet according to any one of Appendices 1 to 8 is arranged along a shelf plate and side plates.

Hereinbefore, although the invention in the present application has been explained with reference to the embodiments, the invention in the present application is not limited by the above. Various changes that can be understood by those skilled in the art within the scope of the invention can be made to a configuration and details of the invention in the present application.

This application claims priority based on Japanese Patent Application No. 2011-265157 filed on Dec. 2, 2011, and the entire disclosure thereof is incorporated herein.

REFERENCE SIGNS LIST

10 Smart Shelf
11 Top Plate
12 Bottom Plate
13 Side Plate
14 Shelf Plate
15 Back Plate
100 Communication Sheet
110 First Conductor Layer
111 Mesh Conductor
120 Dielectric Layer
121 Dielectric Substrate
130 Second Conductor Layer
131 Sheet Conductor
140 Protective Film
150 Opening
250 Opening
350 Opening
450 Opening
511 Mesh Conductor
521 Dielectric Substrate
531 Sheet Conductor
550 Opening

What is claimed is:

1. A communication sheet that transmits an electromagnetic wave for communication, comprising:
    a dielectric layer including a dielectric substrate;
    a first conductor layer including a mesh sheet-like mesh conductor disposed on one surface of the dielectric substrate; and
    a second conductor layer including a sheet-like conductor disposed on another surface of the dielectric substrate opposite to the first conductor layer,
    wherein an opening whose width in a direction perpendicular to a traveling direction of the electromagnetic wave for communication traveling through the dielectric layer is not less than 1/20 and not greater than ⅗ of a width in the direction perpendicular to the traveling direction of the electromagnetic wave for communication of the dielectric substrate is provided, the opening penetrating from the first conductor layer to the second conductor layer.

2. The communication sheet according to claim 1, wherein the dielectric substrate is a substantially rectangular sheet-like substrate in which the opening is provided, and
    a length in a short-side direction of the dielectric substrate is not less than ⅓ and not greater than ½ of an effective wavelength of the electromagnetic wave for communication traveling through the dielectric layer.

3. The communication sheet according to claim 2, wherein as the opening, an opening is provided in a center in the short-side direction of the dielectric substrate, the opening having a substantially rectangular shape whose length in a short-side direction is set to be not less than 1/20 and not greater than 3/5 of the length in the short-side direction of the dielectric substrate.

4. The communication sheet according to claim 2, wherein as the opening, a plurality of openings are provided in parallel in the short-side direction of the dielectric substrate, each of the openings having a substantially rectangular shape whose length in a short-side direction is set to be not less than 1/20 and less than 1/2 of the length in the short-side direction of the dielectric substrate.

5. The communication sheet according to claim 3, wherein the length in the short-side direction of the opening is not less than 1/10 and not greater than 1/3 of the length in the short-side direction of the dielectric substrate.

6. The communication sheet according to claim 5, wherein the length in the short-side direction of the opening is not less than 1/7 and not greater than 1/4 of the length in the short-side direction of the dielectric substrate.

7. The communication sheet according to claim 2, wherein as the opening, a plurality of openings are provided in parallel in a longitudinal direction of the dielectric substrate, each of the openings having a substantially rectangular shape whose length in a longitudinal direction is set to be not less than 1/20 and not greater than 3/5 of the length in the short-side direction of the dielectric substrate.

8. The communication sheet according to claim 2, wherein as the opening, provided is an opening having a meander shape whose width is set to be not less than 1/20 and not greater than 2/5 of the length in the short-side direction of the dielectric substrate.

9. A smart shelf comprising the communication sheet according to claim 1.

* * * * *